(12) United States Patent
Tolk et al.

(10) Patent No.: US 10,080,956 B2
(45) Date of Patent: Sep. 25, 2018

(54) DETECTING THE CHANGING POSITION OF A FACE TO MOVE AND ROTATE A GAME OBJECT IN A VIRTUAL ENVIRONMENT

(71) Applicant: BallCraft, LLC, Los Angeles, CA (US)

(72) Inventors: Philip Tolk, Los Angeles, CA (US); Daniel Mosquera, Chicago, IL (US); Elizabeth Anne Stallone, Los Angeles, CA (US)

(73) Assignee: BallCraft, LLC, Los Angeles, CA (US)

( * ) Notice: Subject to any disclaimer, the term of this patent is extended or adjusted under 35 U.S.C. 154(b) by 266 days.

(21) Appl. No.: 14/845,930

(22) Filed: Sep. 4, 2015

(65) Prior Publication Data

US 2016/0067617 A1 Mar. 10, 2016

Related U.S. Application Data

(60) Provisional application No. 62/046,608, filed on Sep. 5, 2014.

(51) Int. Cl.

| | |
|---|---|
| *A63F 13/00* | (2014.01) |
| *A63F 13/213* | (2014.01) |
| *A63F 13/211* | (2014.01) |
| *A63F 13/428* | (2014.01) |
| *A63F 13/52* | (2014.01) |

(Continued)

(52) U.S. Cl.
CPC .......... *A63F 13/213* (2014.09); *A63F 13/211* (2014.09); *A63F 13/428* (2014.09); *A63F 13/52* (2014.09); *A63F 13/655* (2014.09); *G06T 15/04* (2013.01)

(58) Field of Classification Search
CPC ...... G06F 3/011; G06F 3/048; G06F 3/04842; A63F 13/211; A63F 13/213; A63F 13/428; A63F 13/5255; A63F 13/92; A63F 13/52; A63F 13/655; G06T 15/04
See application file for complete search history.

(56) References Cited

U.S. PATENT DOCUMENTS

| | | | |
|---|---|---|---|
| 2002/0022518 A1* | 2/2002 | Okuda | A63F 13/08 463/36 |
| 2004/0174438 A1* | 9/2004 | Jung | H04N 7/147 348/222.1 |

(Continued)

*Primary Examiner* — Justin Myhr
(74) *Attorney, Agent, or Firm* — Adam K. Sacharoff; Much Shelist, P.C.

(57) ABSTRACT

Methods for a mobile device with a front facing camera to use the detected position of the user's face as a game controller as well as a method of displaying the live streaming face within the video with audio within a virtual environment. Using a reference frame which serves as the origin, the subsequent frames of the live streaming video are used to calculate the change in position of the face detected within the video frame, and calculations of position, rotation, speed and distance are used to position a game object. Additionally this is a method for having a live video stream with live audio textured onto 2D/3D objects within a virtual environment with only the perspective cropped face displayed. This provides the appearance of the face as stable and unmoving even when the device's camera and/or user's face are moving relative to each other.

6 Claims, 13 Drawing Sheets

(51) Int. Cl.
*A63F 13/655* (2014.01)
*G06T 15/04* (2011.01)

(56) References Cited

U.S. PATENT DOCUMENTS

| | | | |
|---|---|---|---|
| 2006/0158524 A1* | 7/2006 | Yang | H04N 19/53 |
| | | | 348/208.6 |
| 2007/0091085 A1* | 4/2007 | Wang | G06T 17/20 |
| | | | 345/420 |
| 2010/0029361 A1* | 2/2010 | Anderson | G06Q 10/087 |
| | | | 463/17 |
| 2011/0141219 A1* | 6/2011 | Yeh | G06T 7/20 |
| | | | 348/14.02 |
| 2011/0304611 A1 | 12/2011 | Suzuki | |
| 2012/0075501 A1* | 3/2012 | Oyagi | H04N 5/772 |
| | | | 348/231.99 |
| 2013/0107064 A1* | 5/2013 | Venkatraman | H04N 5/23258 |
| | | | 348/208.2 |
| 2014/0249894 A1 | 9/2014 | Picard | |

* cited by examiner

DETECTING THE CHANGING POSITION OF A FACE TO MOVE AND ROTATE A GAME OBJECT IN A VIRTUAL ENVIRONMENT

CROSS REFERENCE TO RELATED APPLICATIONS

The present application claims priority to U.S. Patent Application 62/046,608 filed Sep. 5, 2014.

FIELD OF THE INVENTION

This invention relates to methods and computer programs that use existing portable devices and displays with a front facing camera and current face detection algorithms.

BACKGROUND OF THE INVENTION

A virtual environment is a computer-simulated environment, whether that environment is a simulation of the real world or an imaginary world, where users can Interact with a virtual environment or virtual artifacts either through the use of standard input devices or specialized multidirectional devices. Virtual environments are used to describe a wide variety of applications commonly associated with its immersive, highly visual three-dimensional environments including 2D, 3D, Virtual Reality, Augmented Reality, and game environments. The development of Computer Aided Design (CAD) software, graphics hardware acceleration, head-mounted displays, database gloves, and miniaturization have helped popularize the notion.

Portable Device is a generic name that encapsulates general purpose devices that can be wearable such as smart watches and those that can he carried comfortably by the user like smart phones, tablets and mp4 players with Android or iOS systems, and dedicated devices. The portable devices mentioned that our invention makes use of contain front facing cameras.

Display is a generic name for devices also known as computer monitors (desktops and laptops) and televisions that remain in one position most of the time. The displays mentioned here either have an embedded camera or serve as mounts for camera peripherals/accessories.

Face detection is a technology that uses image processing algorithms to detect the face of the user with the common software already in mobile devices. Any other technology in hardware and software that achieves the same solution is also covered.

Video chat is referred to as the technology where users can talk to and see each other no matter the distance or time zones as a result of the real-time transmission of audio and video data over the internet.

UV coordinates is known as a normalized coordinate 2D system that represents all points of a texture or image from one of its corners to its opposite corner. This describes how the texture covers a 3D object in space.

Game objects are the core building block in virtual environments and serve as 2D or 3D elements, game characters such as avatars, or background rendering sprites or game cameras which render the virtual environment of the other game objects within the virtual environment from the game camera's perspective. Game objects can be controlled within 2D and 3D virtual environments via setting the position, rotation and scale of their transform. Game objects have at least a transform component attached (to represent position and orientation).

Additionally, a game object may contain other components which provide additional functionality such as rendering the graphics of the game object, rigid bodies, colliders, particles and audio are all examples of different components (or combinations of components) that can be added to any given game object.

A network refers to the network of the mobile device's transmission of the video which is operating within a networked environment using a communication connection to connect to one or more remote computers. The remote computer may include a mobile device such as a smartphone, personal computer (PC), server, router, network node, or the like. The communication connection may include a Local Area Network (LAN), a Wide Area Network (WAN), or other networks such as cellular networks commonly termed 3G and 4G.

An app refers to a self-contained program or piece of software designed to fulfil a particular purpose; an application, especially as downloaded by a user to a mobile device.

A gyroscope is commonly equipped on mobile devices to provide orientation by giving a 3D position of the devices rotation and orientation. A gyroscope is a sensor commonly equipped in mobile devices to detect orientation of the device by measuring the angular rotational velocity and rate of lateral and tilt change of the device.

An accelerometer is a sensor commonly equipped in mobile devices that measures the linear acceleration of movement relative to a frame of reference to sense orientation of the device.

A perspective correction is a process of straightening and leveling objects within a photograph or video frame. This is done by performing a perspective transformation to the image. The method herein performs the perspective correction based on the gyroscope's sensor's determination of the three dimensional position of the device's rotation compared to the user's designated correct rotation.

A perspective crop is performing a perspective correction and a crop of the image or video frame.

Perspective projection distortion is the inevitable distortion of three-dimensional space when projected onto a two-dimensional surface.

One or more embodiments described herein are developed to transmit over the network a video and optional audio feed containing a perspective cropped user's face which is displayed as 2D texture on a 2D or 3D game object within a virtual environment. The user's face is shown with a corrected perspective and only the face and head are shown within the video stream, no matter the relative position of the user's face in reference to the camera.

2D refers to two-dimensional and 3D refers to three-dimensional.

SUMMARY OF THE INVENTION

As provided in one or more embodiments, there is provided a system for detecting the position of the face of the user and if either their mobile device moves and/or the user's face moves the use of the detected change of position of the face is applied to a game object to move and rotate the game object.

In other aspects of the one or more embodiments, the method of utilizing face tracking can also be used as a game object controller for any object in the virtual environment by using the position and rotation of the detected face in relation to the device and the reference frame UV coordinates to calculate the new position and rotation of any designated object in the virtual environment. When the user wants to use the current position of the mobile device as the origin for re-centering and re-orienting, the user touches the screen to take a picture and then the face detection and its location from that picture is used as the reference for the origin. Additionally, the gyroscopes rotation and orientation data is saved at this time as the base quaternion which serves as the reference data.

In another embodiment there is provided a method that allows for a perspective cropping of user's face within a video stream to be textured onto a 2D texture on a 2D or 3D game object. This perspective cropping of the user's face will always show the users face as centered regardless of the relative position of the user's face in reference to a device's camera. Current face detection technology locates a user's face within a video feed and the video feed remains unchanged. The method described herein uses the video stream to crop the video frames and remove the areas where the face is not detected, leaving the user's centered face always visible. Additionally, the rotation of the device will skew the face within the video stream creating a perspective projection distortion when the user has rotated the device in relation to their face. The method described herein is to detect the rotation difference relative to the user's specified reference rotation of the device and to then apply a perspective correction on the video frame. Additionally, the location of the face within the video stream is detected and the other areas of the video stream are cropped away. When receiving the video and optionally audio stream over the Internet or network for use as a type of video chat and/or to texture onto a game object within a virtual environment either on an avatar of the user where the user's real face is then rendered onto the avatar's face within the virtual environment or onto any other designated game object or in a 2D video chat system, the face is displayed centered and perspective corrected within the video feed. The video feed can come from any standard or specialized camera. The receiver of the video feed will then apply it as a dynamic 2D texture for any defined 2D or 3D object to give the illusion of a constantly centered feed of the user's face. Even though the user's face is moving in reference to the device's camera, the face being displayed is centered.

This effect is that a video stream containing a user's face appears stable and centered even though the device's camera and/or user's face may be moving and rotating 3 dimensionally relative to each other. Thus, the movements of the face within the perspective-cropped frame are seen but the movements and rotations relative to the device's camera position are not seen because a perspective correction is applied and then the areas not containing the face are cropped away. Additionally, another use of this system is that the relative position and rotation of the face in relation to the entire picture serves as a way to obtain precise position and rotation values which are applied to designated game objects functioning as a game object controller.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DETAILED DESCRIPTION OF ILLUSTRATIVE EMBODIMENTS

Figure 1:
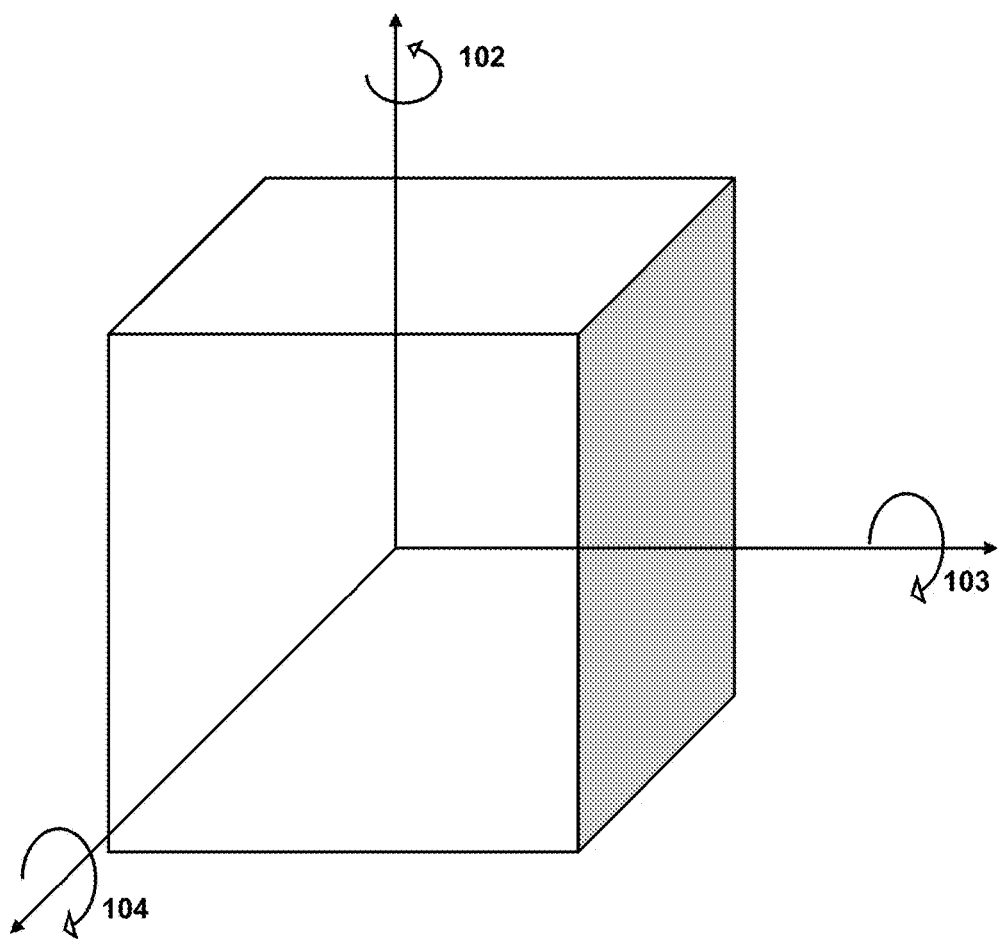
FIG. 1 Describes a common knowledge of the three linear and rotational axes present in any common portable device that exists in the market and a reference for real and virtual environments.

While the invention is susceptible to embodiments in many different forms, there are shown in the drawings and will be described in detail herein the preferred embodiments of the present invention. It should be understood, however, that the present disclosure is to be considered an exemplification of the principles of the invention and is not intended to limit the spirit or scope of the invention and/or claims of the embodiments illustrated.

The following descriptions and diagrams and figures describe a method that allows the cropping of the display of the video feed received over the network using the UV coordinates. This method contains a program that can be adapted to any existing face detecting technology that uses any standard or specialized camera for portable and display devices.

FIG. 1 Describes a common knowledge of the three linear and rotational axes present in any common portable device that exists in the market which are used as reference in both virtual and real worlds. These axes are y or yaw 102, x or pitch 103 and z or roll 104 axes for linear or rotational movement respectively.

Figure 2:
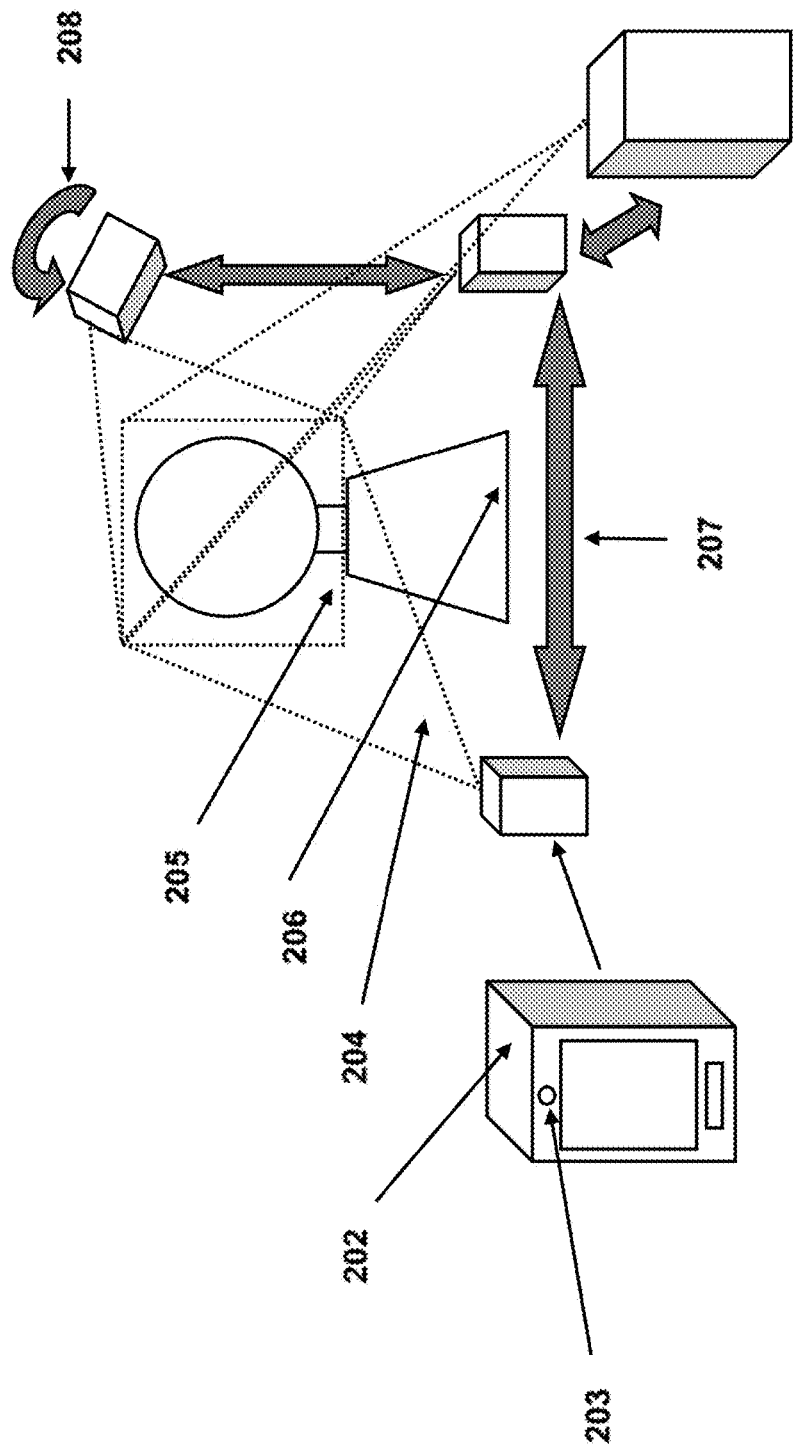
FIG. 2 Illustrates the constant tracking of the user's face no matter the position or rotation of the portable device in reference to the user.

FIG. 2 illustrates the representation of the portable device shown as 202 with a front facing camera 203. When used with the invention and face detection technology shown in 204 a rectangular area 205 will be created containing the video stream of the face of the user 206. The detection is regardless of the linear or rotational movement of the portable device shown as 207 and 208 respectively, where the movement of the device changes the location of the face within the video stream however, the perspective cropping makes the rendering of the face appear as though the face has not moved within the video stream.

Figure 3:
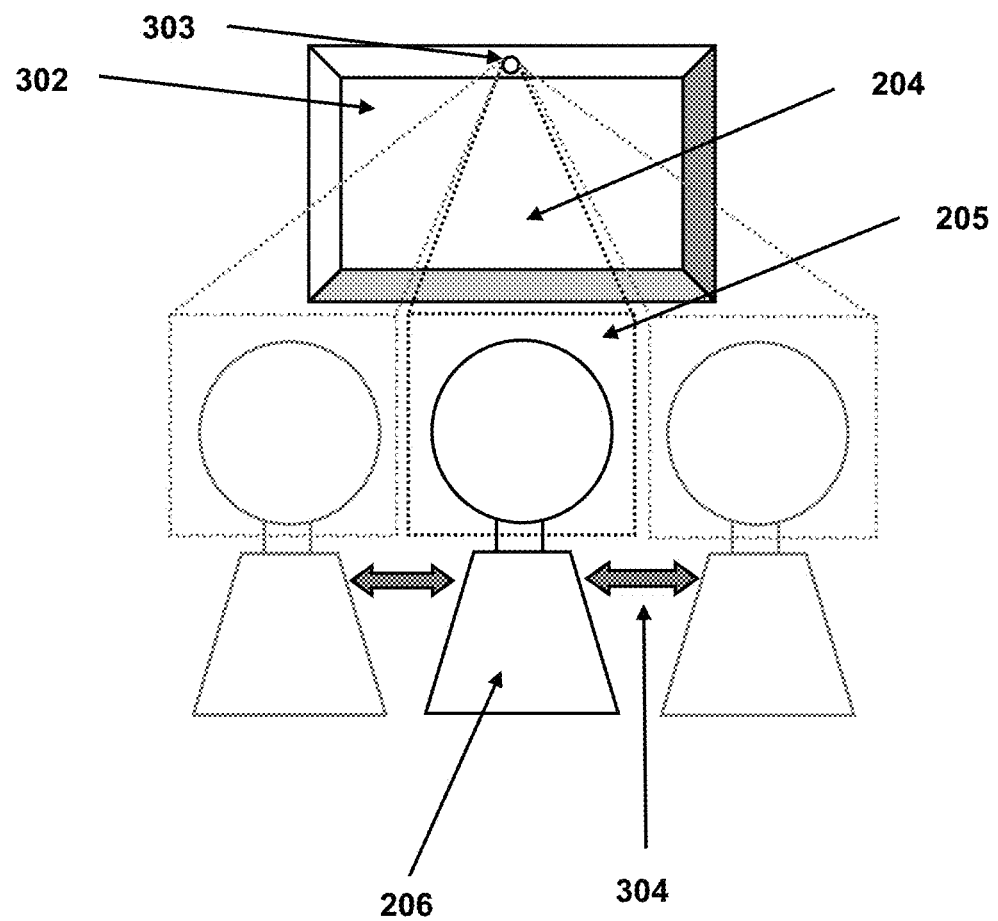
FIG. 3 illustrates the constant tracking of the user's face no matter the position or rotation of the user in reference to a static device such as monitors or televisions.

FIG. 3 302 shows a display device with its own camera (embedded or peripheral) that will never move that will use the invention and face detection technology described in FIG. 2 to calculate the UV points which represent the rectangular area of the user's face regardless of the changing position of the player as described in 304 as long as the face remains in the field of vision of the camera.

Figure 4:
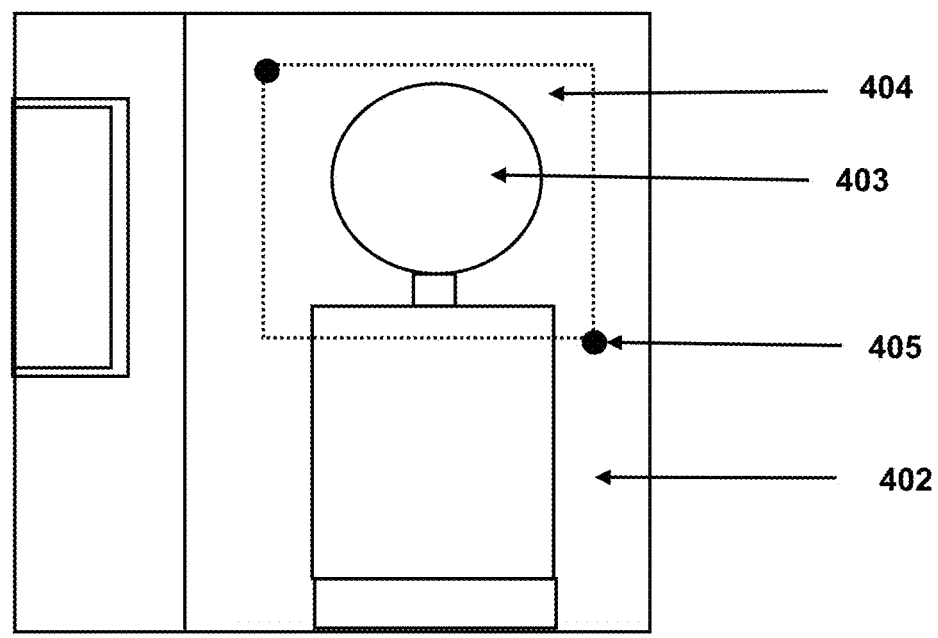
FIG. 4 Explains the detection of the user's face that was perspective cropped and then displayed on a 2D texture on a game object in a virtual environment. This occurs on every frame of a video feed which has a face detected. If no face is detected the last frame of the video with the user's face detected remains displayed on the 2D texture.
Figure 4:
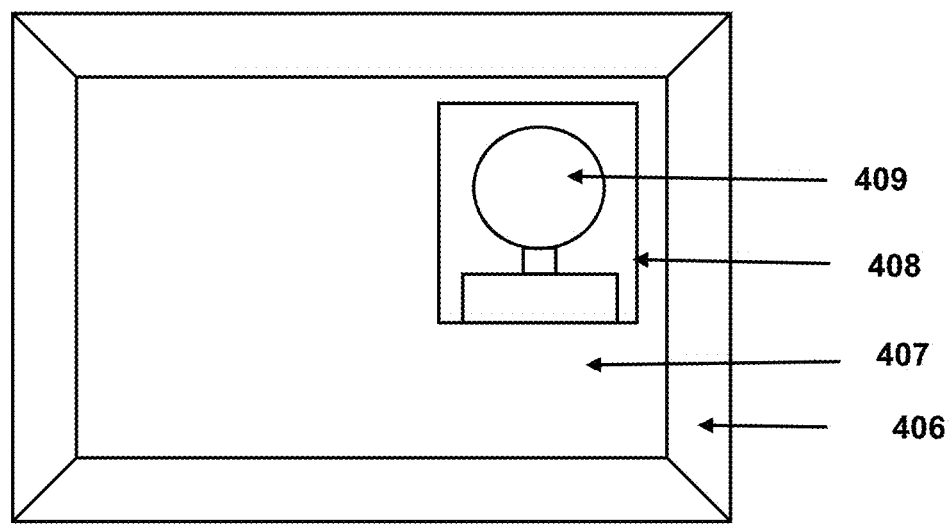

FIG. 4 is a visual representation of how the method in this invention is used along with the face detection technology on a standard frame of a video stream 402 to calculate the UV coordinates 404 centered on the user's face 403. The method only calculates two UV points like 405 that are enough to create the rectangular area of coordinates.

The two points are transmitted with the video feed in its entirety or cropped to the receiving device that will use these points UV coordinates needed to crop the video stream and apply it as a 2D texture 409 to a 3D game object 408 that will be displayed in a virtual environment 407 displayed on any screen 406. Or only the perspective cropped video stream is transmitted and it is applied as a 2D texture 409 to a 3D game object 408 that is displayed in a virtual environment 407 displayed on any screen 406.

Figure 5:
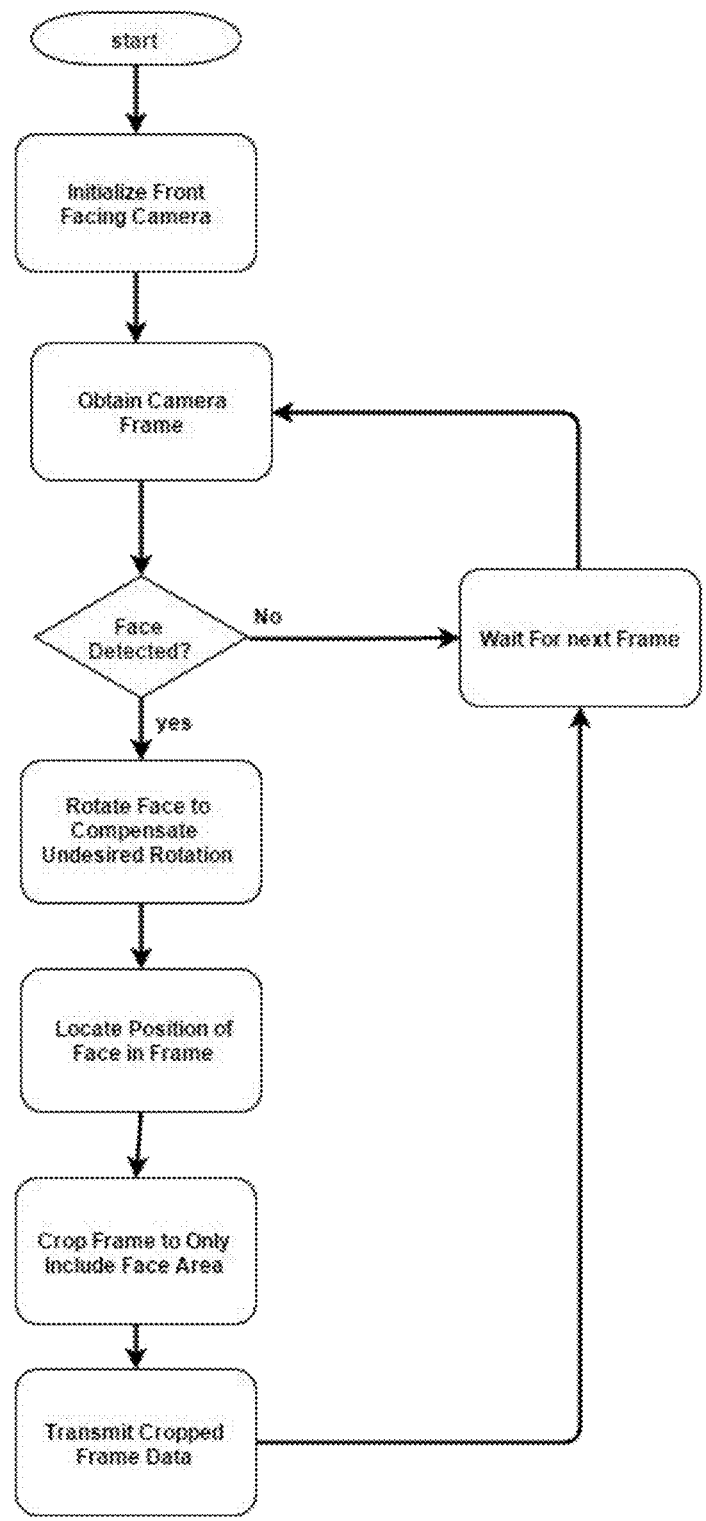
FIG. 5 Contains the flowchart of the algorithm that uses the video stream, face detection data, and gyroscopic data to perform a perspective crop of the video feed and the transmission of it over a network or internet.

FIG. 5 Displays the flow chart of the use of the perspective cropping and face detection technology to transmit over the network the portion of the images that contain the perspective cropped face. The algorithm that accomplishes this is as follows:

```
void Update( )
{
If(profilemode == ProfileMode.Video && mHeadTracker.FaceFound)
//when face is detected, transmit video
{
Quaternion current = GyroUtils.CurrentQuaternion;
Quaternion inverseBase = Quaternion.Inverse(GyroUtils.BaseQuaternion);
Quaternion compensation = current * inverseBase;
videoFeedTexture = ImageCompensator.RotateImage(videoFeed-
Texture ,compensation.eulerAngles);
videoFeedTexture = mHeadTracker.GetFrameTexture( );
mHeadPosition = mHeadTracker.GetHeadCoordinates( );
int width = mHeadPosition.xMax – mHeadPosition.xMin;
int height= mHeadPosition.yMax – mHeadPosition.yMin;
Texture2D croppedImage = new Texture2D(width , height);
croppedImage.SetPixels(videoFeedTexture.GetPixels(
mHeadPosition.xMin, mHeadPosition.yMin, width , height
));
croppedImage.Apply( );
SendToNetwork("VideoUpdate", croppedImage.EncodeToPng( ));
}
}
``` mHeadPosition is a structure given to the algorithm that will help determine the size of the rectangular area centered on the user's face that is desired to be used in the virtual environment.

GyroUtils.BaseQuaternion is the reference rotation of the device when the user designates the device to be in the normal and correct position.

Figure 6:
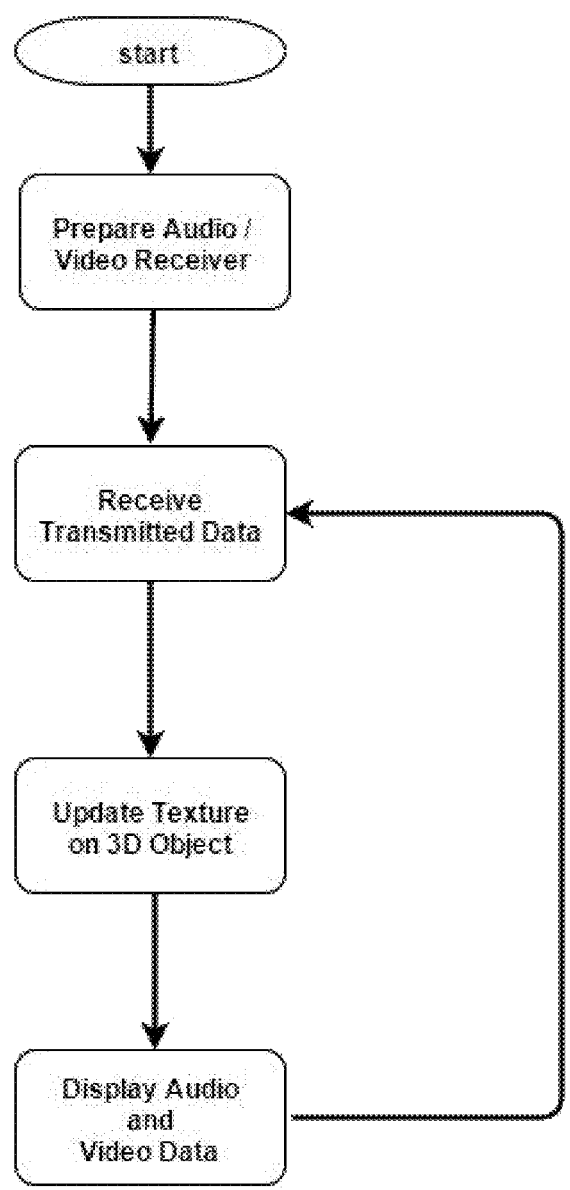
FIG. 6 Contains the flowchart of the algorithm that uses the received video and audio feed to update the 2D texture which is displaying the users face on a 2D or 3D game object in a virtual world.

FIG. 6 Describes the process that obtains the perspective corrected video stream and UV coordinate data and applies it to a 2D texture on any 2D or 3D game object in the virtual world.

```
void VideoUpdate(byte[ ] videoData)
{
mVideoTexture = new Texure2D( );
mVideoTexture.ReadBytes(videoData);
mVideoTexture.Apply( );
objectRenderer.material.mainTexture = mVideoTexture;
}
```

Figure 7:
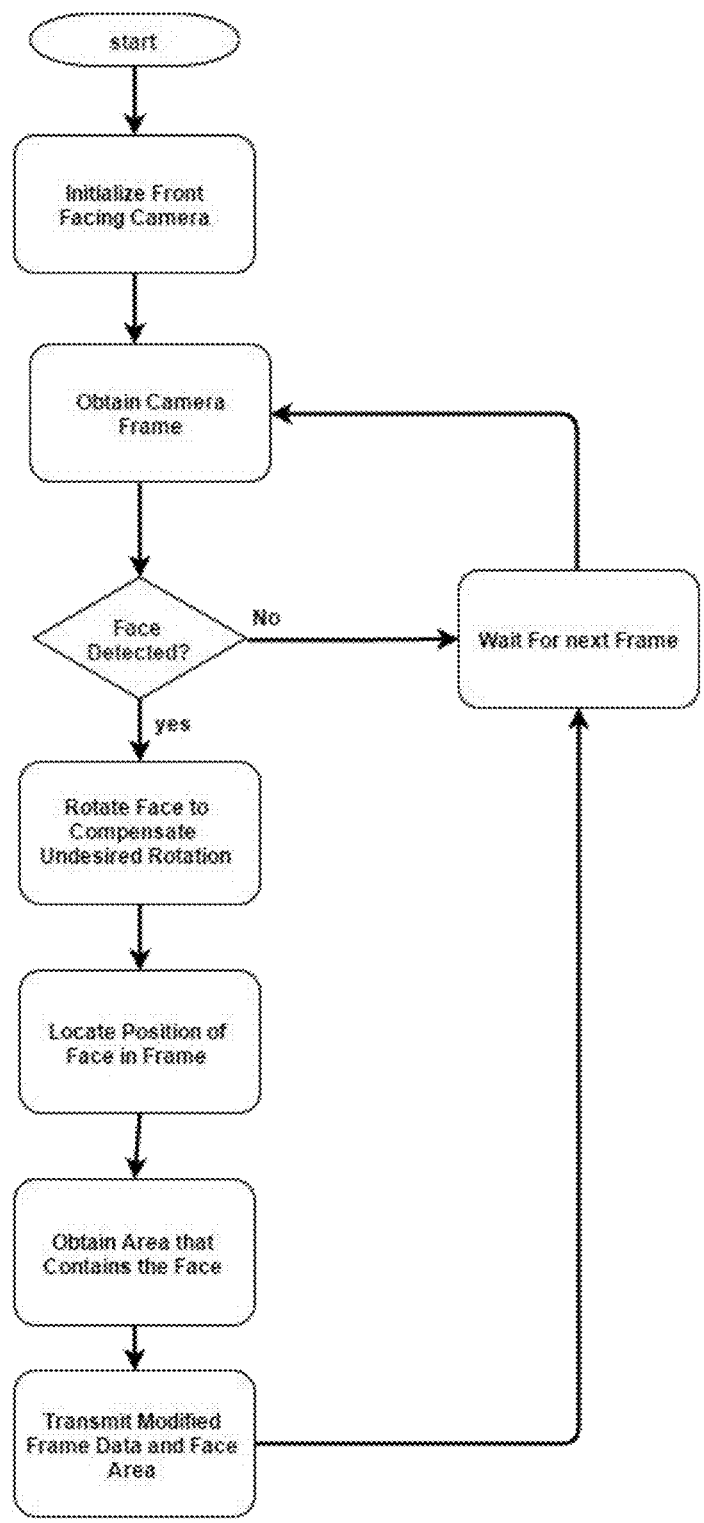
FIG. 7 Contains the flowchart of the algorithm that uses the video feed to perspective correct the image and then to detect the face and calculate the UV data of the user's face and transmit this data over the network.

FIG. 7 Displays the flow chart of the use of the face detection technology and perspective correction to calculate the location of the two UV points necessary for cropping. The algorithm that accomplishes this is as follows:

```
void Update( )
{
If(profilemode == ProfileMode.Video && mHeadTracker.FaceFound)
//when face is detected, transmit video
{
Quaternion current = GyroUtils.CurrentQuaternion;
Quaternion inverseBase = Quaternion.Inverse(GyroUtils.BaseQuaternion);
Quaternion compensation = current * inverseBase;
videoFeedTexture =
ImageCompensator.RotateImage(compensation.eulerAngles);
videoFeedData = mHeadTracker.GetFrameData( );
mHeadPosition = mHeadTracker.GetHeadCoordinates( );
Vector2 uv1 = new Vector2 (mHeadPosition.xMin /
Screen.videoFeedTexture ,
    mHeadPosition.yMin / Screen.videoFeedTexture );
Vector2 uv2 = new Vector2 (mHeadPosition.xMax /
Screen.videoFeedTexture ,
    mHeadPosition.yMax / Screen.videoFeedTexture );
SendToNetwork("VideoUpdate", videoFeedData, uv1, uv2);
}
}
```

Figure 8:
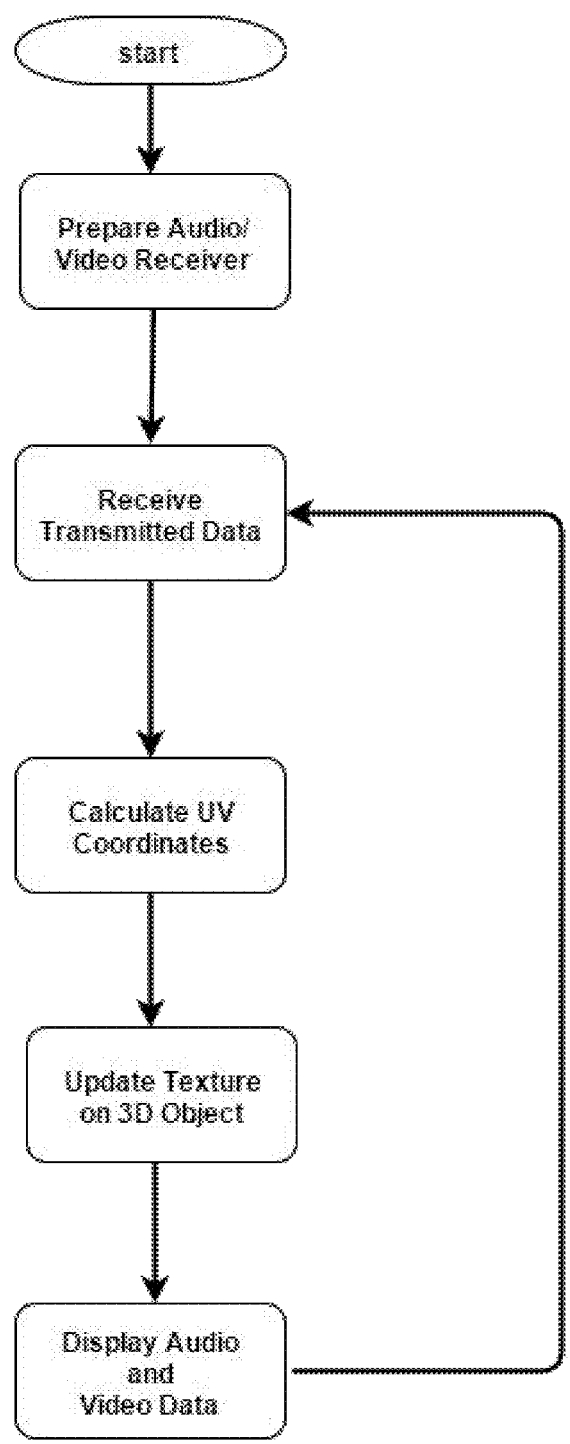
FIG. 8 Contains the flowchart of the algorithm that uses the received perspective corrected video feed and UV coordinates to update the 2D texture which is displaying the user's face on a 2D or 3D game object in a virtual world.

FIG. 8 Describes the process that crops the video stream on the receiving end using the UV points transmitted with the video frame data. The UV points for the rectangular area are calculated and applied on the 2D texture so that the texturing remains centered on the other user's face.

```
void VideoUpdate(byte[ ] videoData, Vector2 coord1, Vector2 coord2)
{
mVideoTexture = new Texure2D( );
mVideoTexture.ReadBytes(videoData);
mVideoTexture.Apply( );
objectRenderer.mesh.uvs = new Vector2[ ] {coord1, coord2};
objectRenderer.material.mainTexture = mVideoTexture;
}
```

Figure 9:
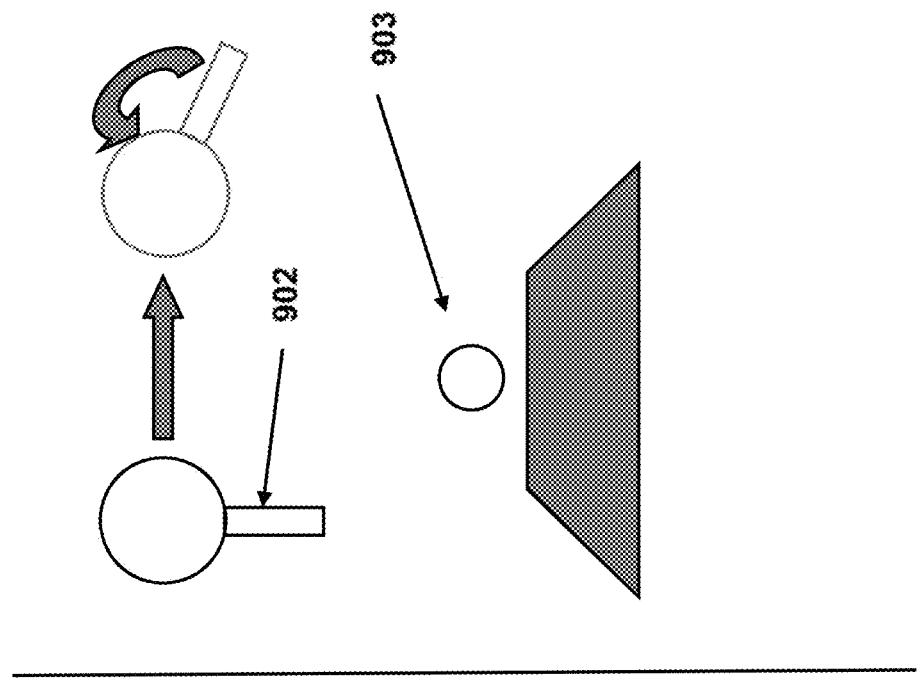
FIG. 9 Illustrates how face tracking is used as a game object controller.
Figure 9:
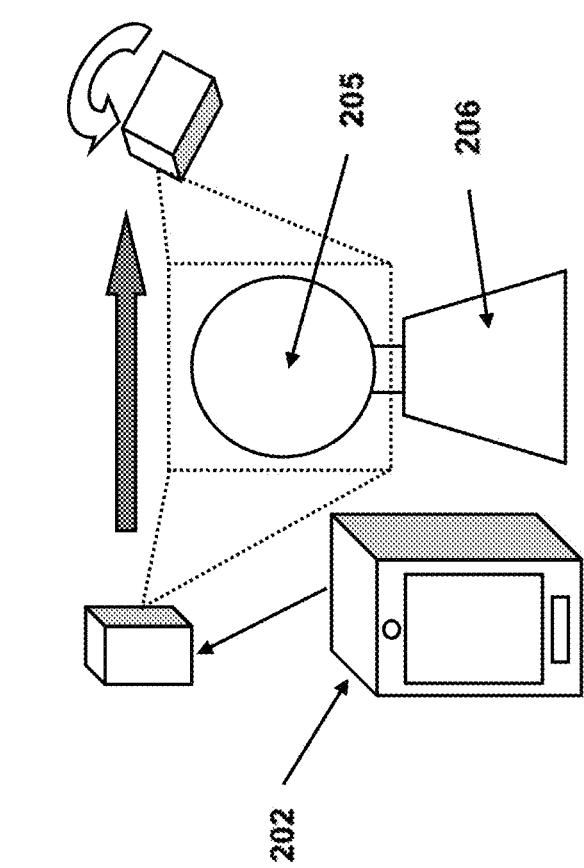

FIG. 9 Shows a typical case where face tracking is used as a game object controller 902 in 3D space 303 by knowing the position and rotation of the face 205 detected by the front facing camera or a device such as 202. Face tracking also detects the depth by using the ratio of the size of the area that contains the face compared to the size of the entire captured frame. This is achieved in both portable devices and static displays.

Figure 10:
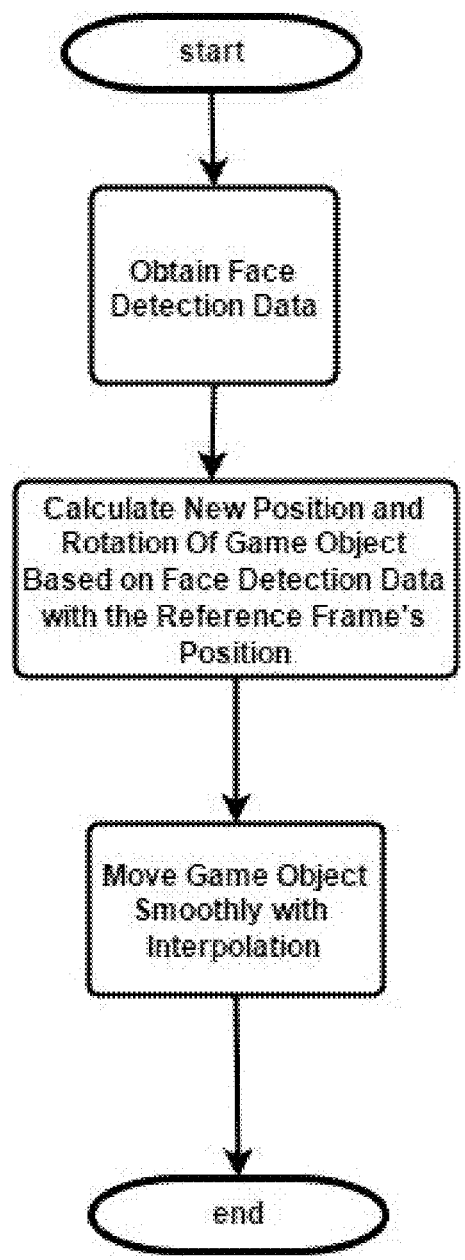
FIG. 10 Contains the flowchart of the process in which face tracking from a video stream is used to control objects in a virtual environment.

FIG. 10 Displays the flow chart of the use of face tracing technology that uses the portable device's front facing camera to change position and rotation of game objects.

When the face is detected, it is compared to the orientation of the device for rotation calculations, and the size of the face is compared to the size of the captured image frame for depth positioning. The vertical and horizontal positions of the face are obtained based on the pixel positioning of the face area and referenced to the center of the image frame.

When face tracking is used as a game object controller in a virtual environment, the following code controls the panning of a paddle or any 3D object as well as its rotation and distance from the reference frame.

```
float scaleFactor = 1f;
float moveSpeed = 20f;
float rotationSpeed = 15f;
void Update( )
{
Vector2 facePosition = -HeadTracker.newPosition * scaleFactor;
Vector2 faceSize = HeadTracker.headSize;
Vector2 ImageSize = HeadTracker.imageSize;
faceSize = faceSize / ImageSize.magnitude; //normalize the size
float faceDistance = (1f - faceSize.magnitude) * scaleFactor;
Vector3 paddlePosition = new Vector3(facePosition.x, facePosition.y, faceDistance);
//Headtrackers can detect the angle of the face to a certain degree and we will obtain the //values here.
    Vector3 angles = new Vector3(HeadTracker.headYaw,
    HeadTracker.headPitch,
        HeadTracker.headRoll);
Quaternion paddleRotation = Quaternion.Euler(angles);
//We update the paddle transform data
paddleTransform.position =
Vector3.Lerp(paddlePosition, paddleTransform.position,
    Time.deltaTime * moveSpeed);
paddleTransform.rotation =
Quaternion.Slerp(paddleTransform.rotation, paddleRotation,
Time.deltaTime * rotationSpeed);
}
```

Besides using interpolation methods, it is also calculated using linear vector and quaternion mathematics which calculate the position and rotation.

```
float scaleFactor = 1f;
float moveSpeed;
float rotationSpeed;
void Update( )
{
Vector2 facePosition = -HeadTracker.newPosition * scaleFactor;
Vector2 faceSize = HeadTracker.headSize;
Vector2 ImageSize = HeadTracker.imageSize;
faceSize = faceSize / ImageSize.magnitude; //normalize the size
float faceDistance = (1f - faceSize.magnitude) * scaleFactor;
Vector3 paddlePosition = new Vector3(facePosition.x, facePosition.y, faceDistance);
Vector3 direction = paddlePosition - paddleTransform.position;
moveSpeed = direction.magnitude * 10f; //constant for scaling speed
direction.Normalize( ); //Normalize the direction vector
//Headtrackers can detect the angle of the face to a certain degree and we will obtain the //values here.
Vector3 angles = new Vector3(HeadTracker.headYaw,
HeadTracker.headPitch,
    HeadTracker.headRoll);
Quaternion paddleRotation = Quaternion.Euler(angles);
float angle = Quaternion.Angle(paddleTransform.rotation, paddleRotation);
rotationSpeed = angle * 5f ////constant for scaling rotation speed
//We update the paddle transform data
paddleTransform.Translate(direction * Time.deltaTime * moveSpeed);
paddleTransform.rotation =
Quaternion.RotateTowards(paddleTransform.rotation,
paddleRotation, Time.deltaTime * rotationSpeed);
}
```

Figure 11:
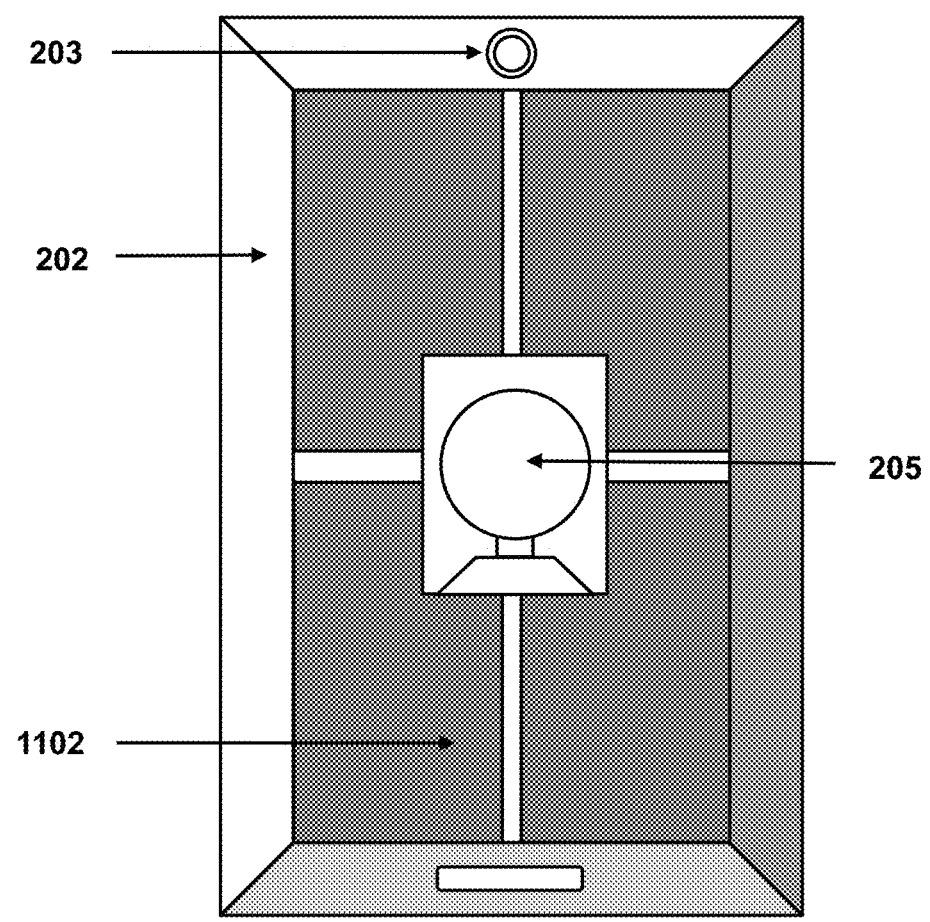
FIG. 11 illustrates a way to calibrate the face tracking for any given application by taking a reference picture in which the face is captured for base calculations as well as the gyroscopes rotational data which serves as the base quaternion.

FIG. 11 Illustrates a way to calibrate the face tracking for any given application. A reference frame which serves as the origin is created by the app so that the user can position the portable device 202 such that a detected moving face of the user 205 by the front facing camera 203 is centered. The calculated size of the rectangular area containing the face in the reference frame is a distance of zero along the Z axis. When moving forward or backward, the detected face's rectangular area will be compared to the reference frame's rectangular size and the change in size will be used to compute the distance along the Z axis to move a game object. Similarly, the reference frame with the face detection's center of the rectangle is considered the origin. The change of position of the calculated center of the rectangle of the detected face is used for panning a game object in both the vertical Y axis direction and the horizontal X axis direction.

To establish a reference frame to be used as the origin in both the perspective correction and the game object controller, the user has to touch the screen 1102 and a picture is taken that will be used as the origin for all movements. Also, the gyroscopes rotation is saved as the quaternion base. A front facing camera with a face within the cameras view is always required for rotation calculations and is already covered in the face detection technologies which are commonly available in standard Apple and Android SDK available for use in this invention. The calibration presented can be customized so that the center and origin point can be anywhere within cameras field of view and devices orientation.

```
private float baseScale
private Vector2 faceCenter;
float scaleFactor = 1f;
public void Calibrate( )
{
Vector2 faceSize = HeadTracker.headSize;
Vector2 ImageSize = HeadTracker.imageSize;
faceSize / ImageSize.magnitude; //normalize the size
baseScale = faceSize.magnitude;
faceCenter = -HeadTracker.newPosition * scaleFactor;
}
```

Figure 12:
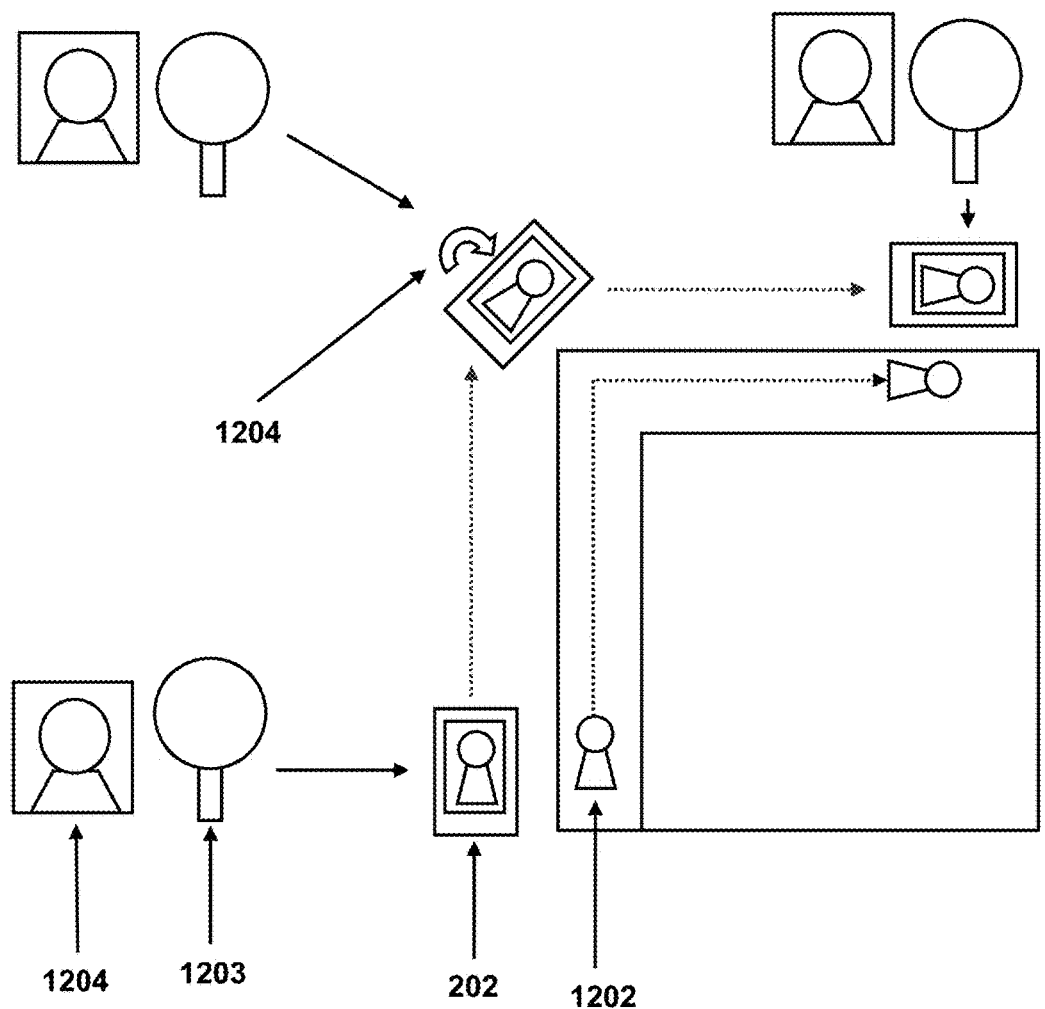
FIG. 12 illustrates an example on how face tracking is used to adjust the data from the gyroscope and accelerometers.

FIG. 12 Shows an example in which motion controls only can provide a wrong input for a game when an action was registered properly. If a user 1202 walks on a sidewalk and turns into a corner, the device 202 will detect a rotation 1204 that will result in a rotation of a game object 1203 in the virtual space. However, since the face tracking has detected that the user has not rotated the device relatively to that face, the code can nullify the influence of the motion controls. This also applies to the case when it is desired to compensate the rotation of the face relative to the portable device so that the texture that is displayed during the video feed always shows the user's face looking at the portable device to give the effect that the user has not moved at all.

Face detection is used to determine if the user's whole body is turning in which case the code will negate the turn input from the accelerometers and gyroscopes based on the positioning of the hand relative to the face, it can also serve as a constant compensator when both motions are detected correctly and correct the speed of rotation of game objects in the virtual space.

Figure 13:
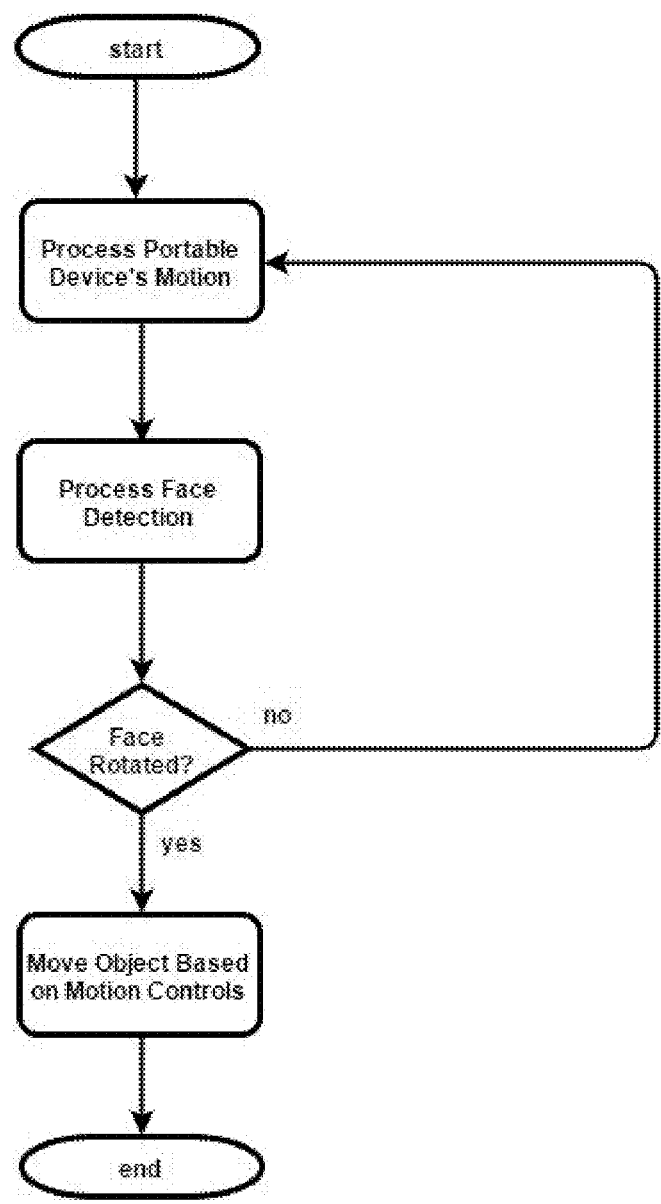
FIG. 13 Contains a flow chart that shows how the face tracking is used to adjust the data of the gyroscope and accelerometers.

FIG. 13 Contains the flow chart that explains how the process is working.

```
private HeadTracker headTracker;
private MotionDetector motionDetector;
```

-continued

```
private Quaternion previousRotation;
Void Update( )
{
Quaternion faceRotation = headTracker.faceRotation;
float angles = Quaternion.Angles(faceRotation , previousRotation);
If(angles > 10) // a considerable ammount of rotation of the face
{
Quaternion deviceRotation = motionDetector.GetRotation( );
Transform.rotation = deviceRotation * Quaternion.Inverse(faceRotation);
}
}
```

In one or more embodiments of the present invention there is provided methods and computer algorithms for a mobile device with a front facing camera to use the detected position of the face of the user as a game controller as well as a method of displaying a live stream of only the face with audio within the video within a virtual environment. Using a reference frame which serves as the origin, the subsequent frames of the video are then used to calculate the change of the position of the face which is detected within the video frame, and the calculations of the position, rotation, speed and distance are used to position a game object. Additionally this is a method for having a live video and audio stream textured onto 2D and 3D objects within a virtual environment with only the cropped and centered face being displayed. This provides the viewer of the video stream the appearance of the face as stable and unmoving even when the device's camera and/or user's face are moving relative to each other. Simultaneously, the video, audio and data may be transmitted to other users within the virtual environment allowing the recipient of the live video and data to texture a 2D and 3D object with only the face being displayed from the live video stream. Using existing face detection technologies, our methods compute a rectangular area from a frame captured from the front facing camera of a mobile device to create a texture that will always show the face of the user live streaming with live audio as long as it is within the camera's field of vision. The face of the user will be applied as a live video and audio stream texture with the centered user's face rendering onto a designated 2D or 3D object for use in any application or game, either inside the same user's device or any other user's device that is connected in the same network. The relative position and rotation of the fate in relation to the entire picture can then serve as a way to obtain precise position and rotation values for game objects in a virtual environment making the face a 2D or 3D game object controller within a virtual environment.

From the foregoing and as mentioned above, it is observed that numerous variations and modifications may be effected without departing from the spirit and scope of the novel concept of the invention. It is to be understood that no limitation with respect to the embodiments illustrated herein is intended or should be inferred. It is intended to cover, by the appended claims, all such modifications within the scope of the appended claims.

We claim:

1. A method for rendering a face of a user onto a texture game object within a virtual environment, the method comprising:
   creating a live video stream from a front facing camera with a face detection algorithm defined on a mobile device, wherein the live video stream includes a face of a user;
   performing a perspective crop on the live video stream such that the face of the user is stabilized when the mobile device and camera are moving, to define a perspective-cropped face live video stream;
   defining UV coordinates from the live video stream;
   rendering the perspective-cropped face live video stream onto a texture of a two-dimensional or three-dimensional game object within a virtual environment; and
   using the UV coordinates as a game controller to control the two-dimensional or three-dimensional game object within the virtual environment.

2. The method of claim 1, including:
   creating a reference rotation from a gyroscope data set defined on the mobile device when the face of a user is centered within the live video stream and designating the reference rotation as a center position; and
   wherein the step of performing a perspective crop on the live video stream includes calculating into the perspective crop an offset of a current gyroscope data from the center position.

3. The method of claim 2, further including:
   transmitting the perspective-cropped face live video stream over a network to a second device.

4. The method of claim 3, wherein the transmitted perspective-cropped face live video stream includes video and audio.

5. The method of claim 4, wherein the two-dimensional or three-dimensional game object is a virtual avatar of the user, and wherein the virtual avatar includes an avatar face, and the method further includes: rendering the avatar face with the perspective-cropped face video stream.

6. The method of claim 1, including the step of creating a reference frame for the face of the user detected by the face detection algorithm and defining reference UV coordinates in the reference frame, and wherein the reference UV coordinates are an initial origin point for use with the joystick or game controller.

* * * * *